(12) United States Patent
Gallegos

(10) Patent No.: US 7,581,858 B1
(45) Date of Patent: Sep. 1, 2009

(54) LIGHT-EMITTING DEVICE FOR THE INTERIOR OF A VEHICLE WITH MUSIC SYNCHRONIZATION

(76) Inventor: Juan M. Gallegos, P.O. Box 18951, Austin, TX (US) 78760

( * ) Notice: Subject to any disclaimer, the term of this patent is extended or adjusted under 35 U.S.C. 154(b) by 0 days.

(21) Appl. No.: 12/035,662

(22) Filed: Feb. 22, 2008

(51) Int. Cl.
*B60Q 1/00* (2006.01)
*B60Q 1/26* (2006.01)

(52) U.S. Cl. .................. 362/488; 362/249.05; 362/271; 362/276; 362/800; 362/802

(58) Field of Classification Search ................ 362/249, 362/251, 269, 271, 276, 295, 540, 800, 802, 362/249.01, 249.02, 249.05, 487, 488
See application file for complete search history.

(56) References Cited

U.S. PATENT DOCUMENTS

2006/0017586 A1* 1/2006 Suzuki et al. ............ 340/815.4

* cited by examiner

*Primary Examiner*—Jason M Han
(74) *Attorney, Agent, or Firm*—Louis Ventre, Jr.

(57) ABSTRACT

An illuminating apparatus shows music effects with light sequences in a vehicle. The apparatus includes a support structure that is installable on an electrical socket. A switch on the base structure activates the apparatus. A transparent container with cut-outs surrounds the base structure and includes a white light activated by the switch. A direct current motor has an axle configured to rotate the base structure within the container. A circuit board is attached to the axle enables rotation of the circuit board within the container. The circuit board can activate sequences of light upon detection of a music signal and can detect a signal from a remote control. Light emitting sources are operably connected to the circuit board to rotate with the circuit board and to project light through the container. A remote control comprises buttons for controlling apparatus operational functions.

2 Claims, 8 Drawing Sheets

US 7,581,858 B1

LIGHT-EMITTING DEVICE FOR THE INTERIOR OF A VEHICLE WITH MUSIC SYNCHRONIZATION

TECHNICAL FIELD

This invention is related to electronics, light effects, music, and the improvement in appearance of a car at night or in the absence of light. The invention is used to illuminate the interior of a vehicle with colors and light motion, offering a new way to enjoy the driving experience.

BACKGROUND ART

This invention offers a new way to enjoy the driving experience with an electronic apparatus that includes technology to detect the type of music played inside a car and be able to provide different types of light sequences and motion. Some inventions in the past describe circuits to display lights from LEDs like U.S. Pat. No. 6,328,456, and some inventions that determine rhythm units of music with inventions like U.S. Pat. No. 6,812,394, but no prior art shows music effects with light sequences that is controlled with a remote control. This invention is designed to be used in the interior of a car but could be used for open spaces.

SUMMARY OF THE INVENTION

This invention generates fancy lights, or projections inside a vehicle, is controlled by a circuit which triggers a sequence of lights depending of the music played inside a vehicle, the device is placed on the roof or trunk and plugged to the sockets of the vehicle, a remote control is provided to easy handle the operations to change the behavior of the apparatus.

DESCRIPTION OF EMBODIMENTS

Figure 1:
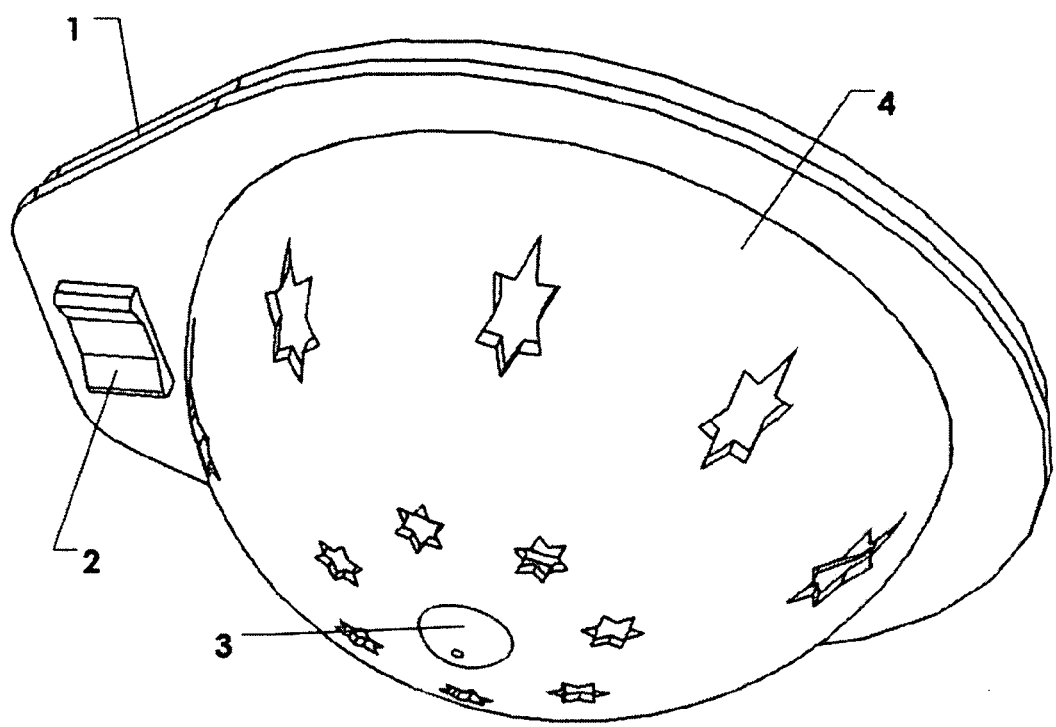
FIG. 1 is a representation of the complete electronic apparatus to display lights, shapes or images in the interior of a car or vehicle.

Referring to FIG. 1, the device consists of a body with a base structure 1 which supports all the elements of the apparatus, such as for example, the circuit and the switch 2. The center of the structure is a spherical body 4 for the electromechanical components of the circuit. This container may be made of plastic, crystal or any other metal and preferably, it is made of a transparent material that permits light rays to pass through it. The design is not limited to the shape shown, and it may have varied cuts, designs, or drawings. The low part of the spherical body 4 contains a light 3. The light 3 could be a bulb, an array of LEDs, or any other light-emitting device in order to provide white light when required. The switch 2 controls the selection of function required: one selection could be only white light, a second state could be an off state, a third state could be the option to select the projection of lights.

Figure 2:
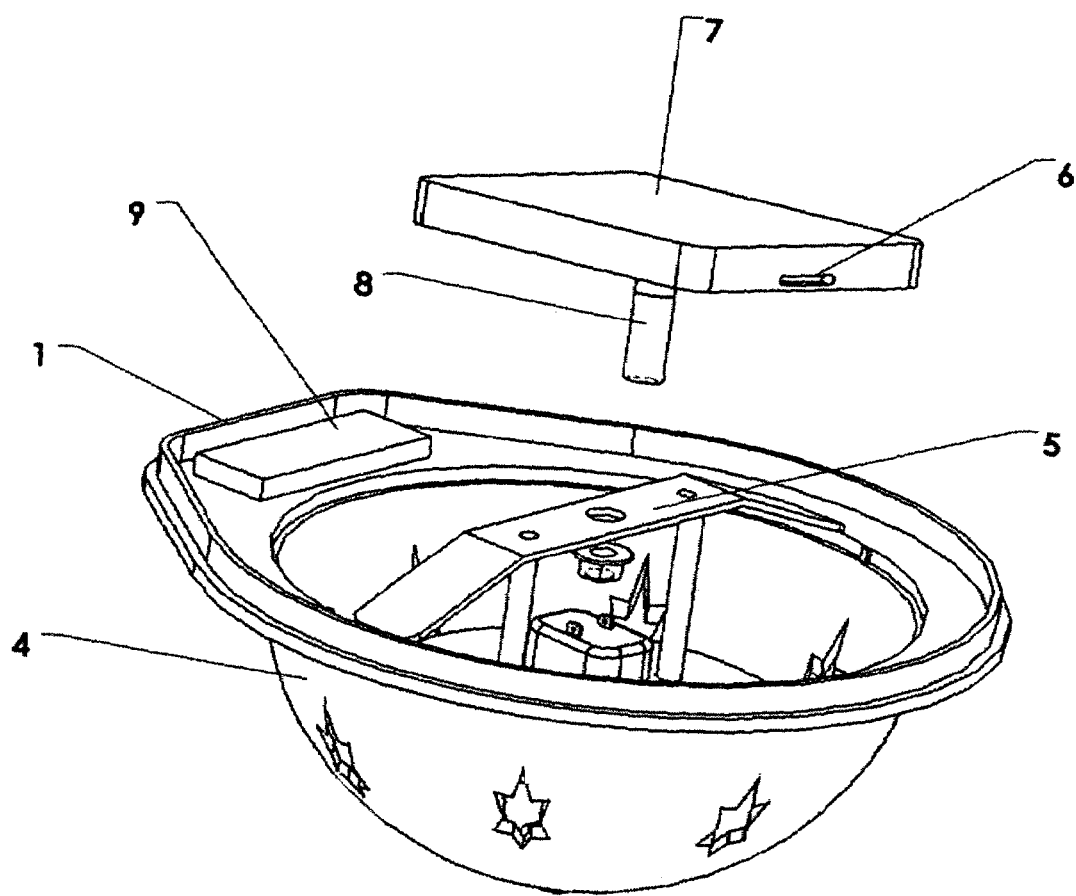
FIG. 2 is a perspective upper view showing the parts required to be held inside a vehicle.

Referring to FIG. 2, this drawing shows support for the support structure 7 that typically exists on the inside roof dome of vehicle. It has an outlet 6 where the cables of DC supply power to the lamps inside a car, a screw 8 or a nut can be found attached on almost all types of vehicles where a bridge 5 can be fixed on the structure. Inside the base structure 1 could be found a source of power 9 and circuits useful to control on/off operation of the device, as well as the receptor of a remote control 20 (FIG. 5) which causes changes of speed in a DC motor 10, shown in FIG. 3.

Figure 3:
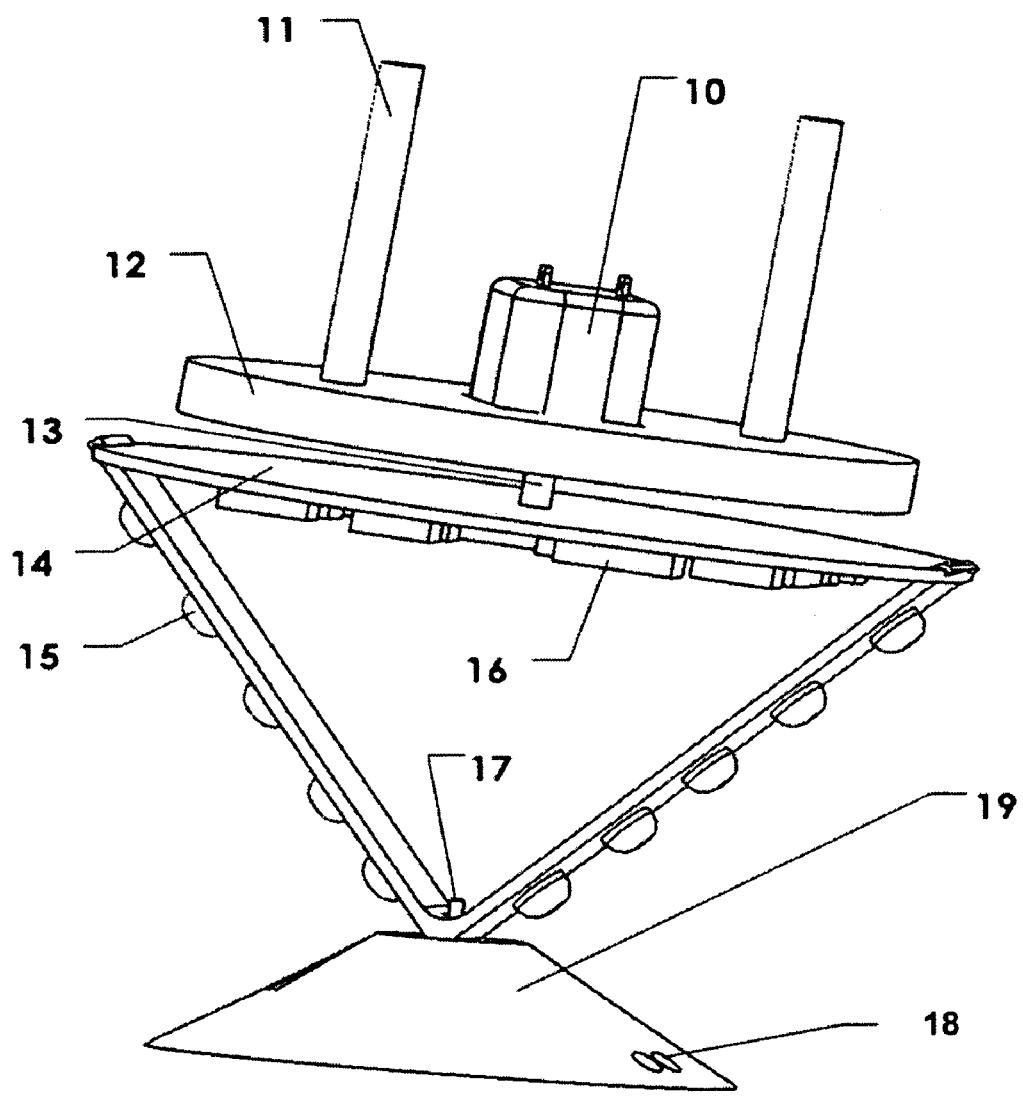
FIG. 3 is the electronic device representation located at the center of the apparatus.

Referring to FIG. 3, a holder 11 supports the DC motor 10 that is attached to a base plate 12. The axle 13 of the DC motor 10 holds the circuit board 14 causing rotation of the circuit 16. The circuit board 14 holds the circuit 16. The circuit 16 controls the generation of sequences of lights, detects the rhythm of the music and detects the signal from a remote control 20, shown in FIG. 5.

A series of bulbs, LEDs, laser LEDs or any other type of light emitting sources 15 are arranged with an angle of projection in order to reach the roof, the windows and the interiors of a car with a conical shape but not limited to this structure. The circuit 16 is powered through the axle 13 in form of a plug 17, the center of the axle 13 can provide positive DC voltage, the exterior of the axle 13 can provide negative DC voltage or vice-versa depending on the configuration of the circuit 16. The circuit 16 is fastened to a platform 19, which contains a power outlet 18 for DC voltage. The platform 19 can be fixed on the interior of the spherical body 4, above the light 3 that illuminates on normal conditions.

Figure 4:
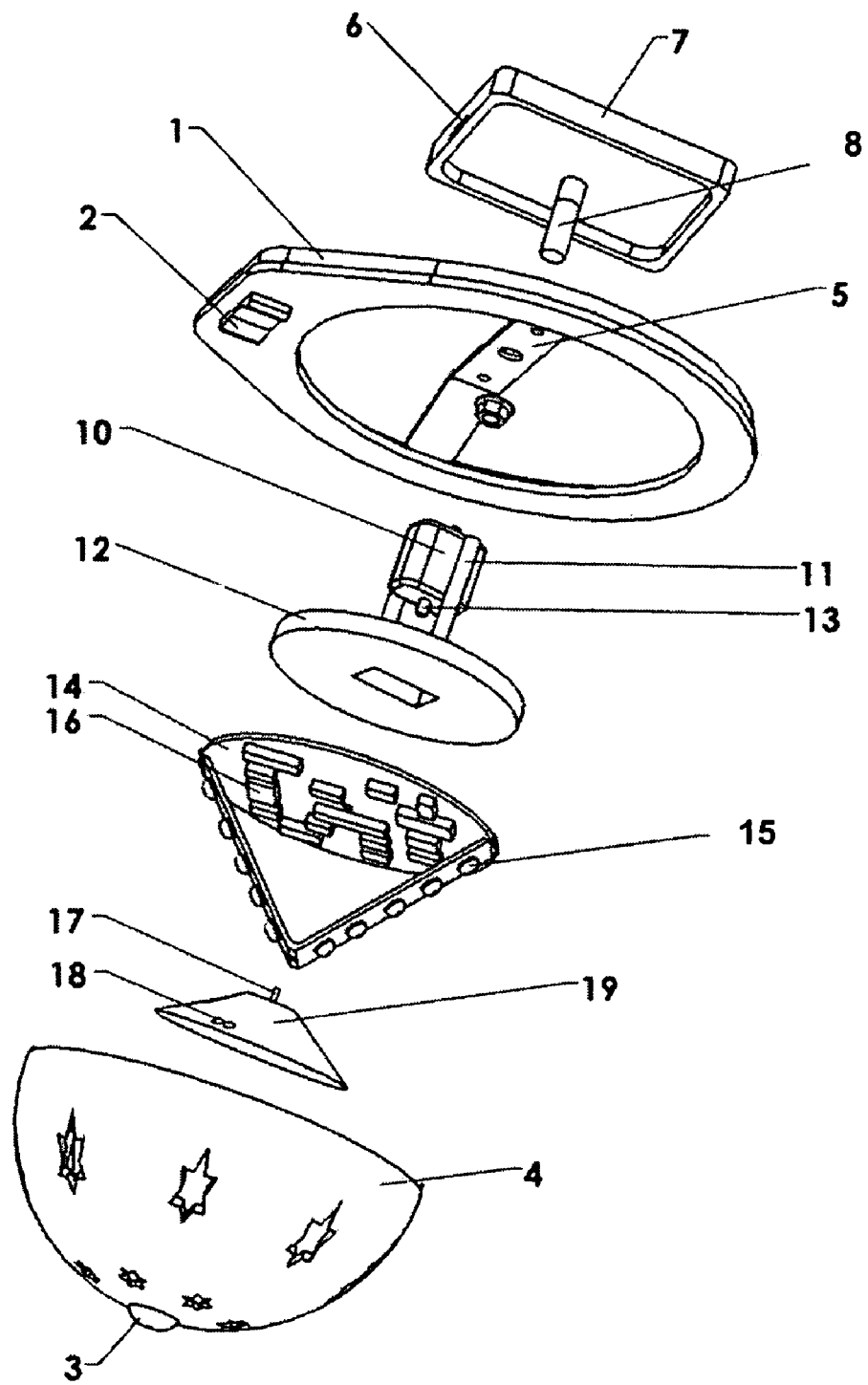
FIG. 4 is an exploded view of the parts that are present in the apparatus.

Referring to FIG. 4, this drawing illustrates all the parts that provide a basic functionality. The device is fixed on a support structure 7 on the roof or trunk of a vehicle, but not limited to these areas. Close to these areas is an outlet 6 or cables which supply power to the interior lamps of a car. Once the device is assembled, it may be activated by a switch 2 or by activating an on/off button 21 on the remote control 20, shown in FIG. 5. DC current from a source of power 9 permits the flow of power to the circuit 16, the motor 10, the light 3, and the power outlet 18. The base structure 1 holds the spherical body 4, base plate 12, and circuit board 14, which in turn are held by a bridge 5, which is part of the base structure 1. The spherical body 4 shields the circuit board 14, light emitting sources 15, and the circuit 16. Holder 11 secures the motor 10 to the bridge 5 and a base plate 12. A support structure 7 supports the apparatus using a screw 8 and nut. A platform 19 contains the power outlet 18 and the plug 17.

Figure 5:
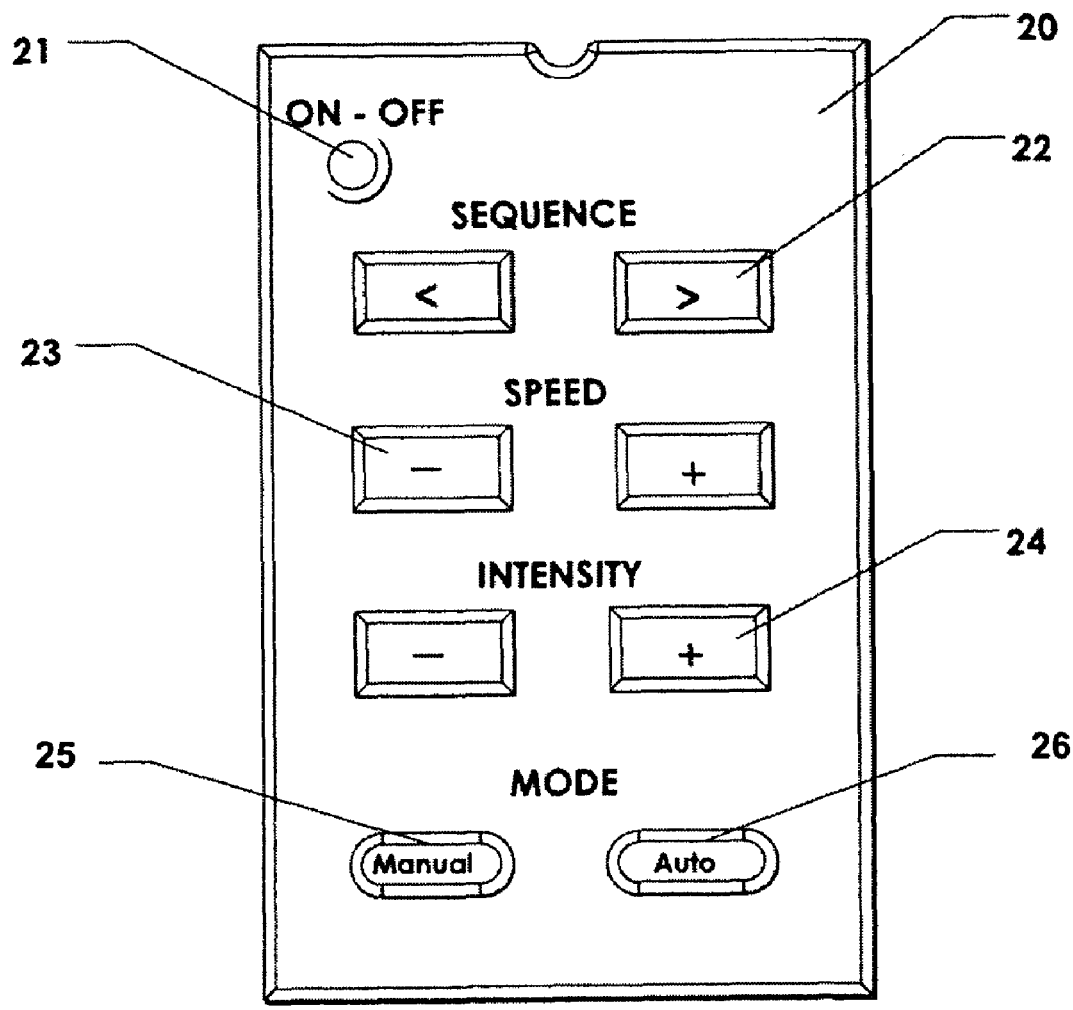
FIG. 5 is a drawing of the remote control useful to select sequences of lights, speed of rotation, intensity of light or projected image, and operational mode.

Referring to FIG. 5, this drawing shows the remote control 20. The remote control 20 contains an on/off button 21 for activating or deactivating the device. The remote control 20 has other buttons to control the mode of operation of the device. As shown, there is a manual operation button 25 and an automatic mode button 26. When the manual operation button 25 is selected, then it is possible to change the sequences of lights with a button 22, the speed of the device with button 23 and the intensity of lights with button 24. When the automatic mode button 26 is chosen, then the device works according to the predefined setting of the circuit 16, diagrammed in the circuits of FIG. 6 and FIG. 8.

Figure 6:
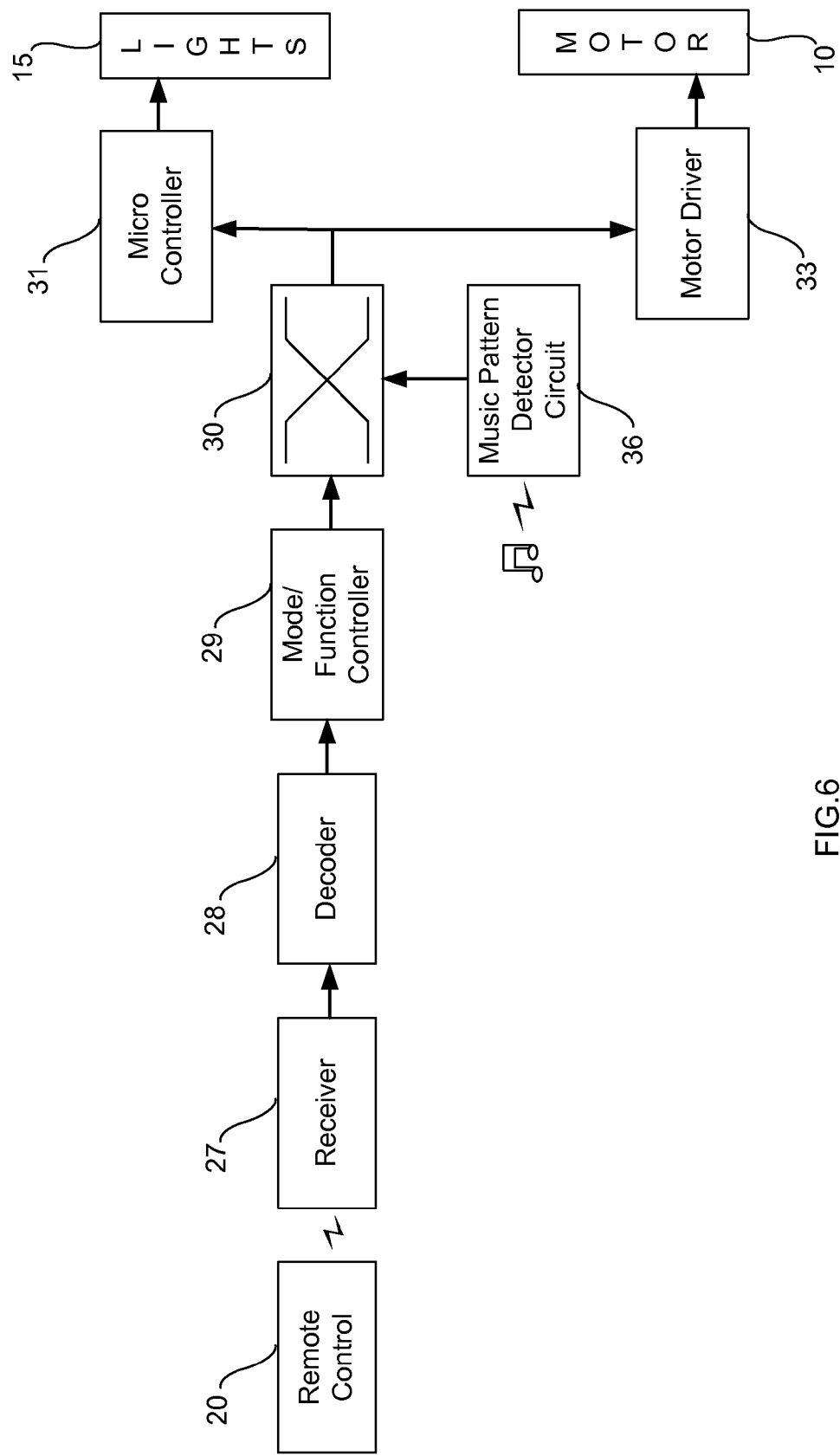
FIG. 6 is the electronic circuit representation of the device.

Referring to FIG. 6, it shows the most important components of the circuit 16 operable with a remote control 20 to activate a mode of operation. A receiver 27 receives a signal from the remote control 20. A decoder 28 obtains the type of function desired from the user. A mode/function controller 29 analyses the input and chooses the corresponding function, a switch 30 depending if the function is activated for manual or automatic mode. When a music signal 35 is present, a music pattern detection circuit 36 analyzes the pattern of music played and communicates to a micro controller 31 and a motor driver 33 that modifies the speed of the motor 10 and controls light emitting sources 15.

Figure 7:
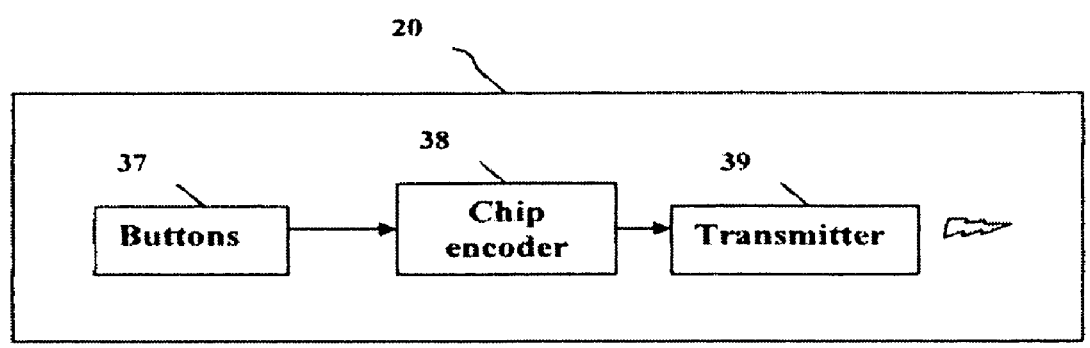
FIG. 7 is the electronic circuit representation of the remote control.

Referring to FIG. 7, the block drawing shows the schematic representation of the remote control 20 with the buttons 37, a chip encoder 38 that analyses the type of function desired from the user, and a transmitter 39 to send a command to the receiver 27 shown in FIG. 6.

Figure 8:
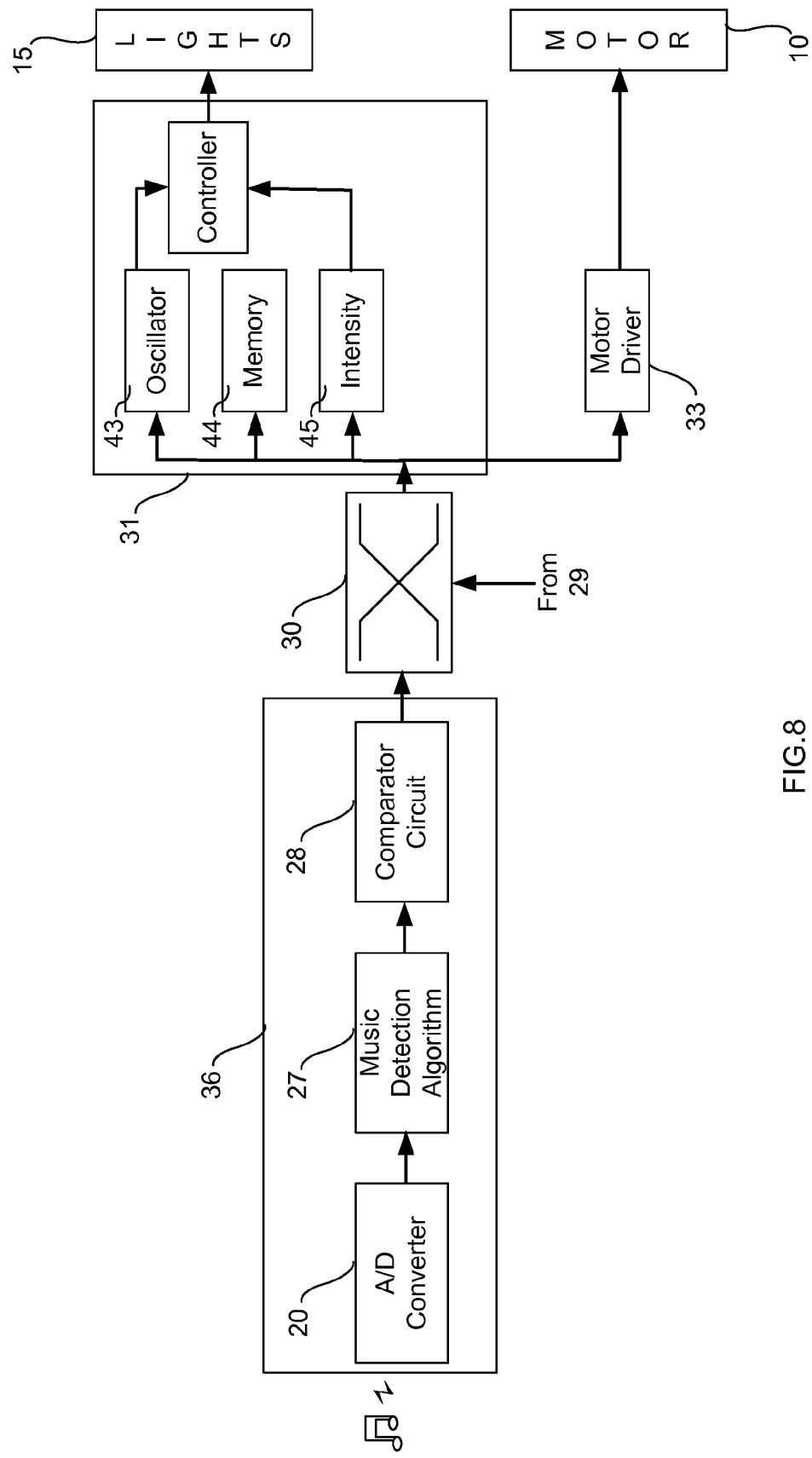
FIG. 8 is the block diagram of the micro controller and the music detection circuit.

Referring to FIG. 8, the blocks on this drawing are the elements inside a micro controller 31 and the music pattern detection circuit 36. When a music signal 35 is present, an A/D converter 40 circuit converts the music signal 35 to a digital signal and enables a music detection algorithm 41 to detect the digital signal. A comparator circuit 42 analyzes the digital signal to select a pattern and sends information to the motor driver 33 on speed of the oscillator 43, change the sequence of lights using memory 44, and intensity 45 of lights or image projectors.

The invention claimed is:

1. An illuminating apparatus to show music effects with light sequences, the illuminating apparatus consisting of:
    a base structure to support the apparatus configured to be fixed on a socket of a motor vehicle, the socket comprising cables accessible to provide direct current power to the apparatus;
    a switch on the base structure configured to manually activate functions of the apparatus;
    a container configured to define shapes cut from the container and further configured to surround the base structure and permit light to be transmitted therethrough, the container comprising a light emitting device configured to provide white light upon activation by the switch;
    a direct current motor comprising a rotatable axle extending therefrom, the motor configured for attachment to the base structure within the container at the end opposite the axle;
    a circuit board attached to the axle so as to permit rotation of the circuit board within the container by the direct current motor, the circuit board configured to activate sequences of light from light emitting sources upon detection of a music signal and further configured to detect a signal from a remote control;
    a plurality of light emitting sources operably connected to the circuit board to rotate with the circuit board and to project light through the container in a manner controlled by the circuit board; and,
    a remote control comprising buttons for controlling apparatus operational functions selected from the group consisting of turning the apparatus on; turning the apparatus off; engaging manual operation of the apparatus; engaging automatic operation of the apparatus; changing the sequence of lights; and changing speed of rotation of the plurality of light emitting sources.

2. The illuminating apparatus of claim 1 wherein the circuit board comprises a microcontroller; and a music pattern detection circuit wherein the music pattern detection circuit comprises: a converter to digital circuit; a pattern selector circuit configured to control functions selected from the group consisting of: operation of the DC motor, speed of an oscillator, sequence of light emitting sources, intensity of light emitting sources, and intensity of image projectors.

* * * * *